United States Patent
Bajaj

(10) Patent No.: US 10,261,865 B1
(45) Date of Patent: Apr. 16, 2019

(54) FAST AND OPTIMIZED RESTORE USING DELTA INFORMATION

(71) Applicant: Cohesity, Inc., Santa Clara, CA (US)

(72) Inventor: Rupesh Bajaj, Dewas (IN)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 15/964,678

(22) Filed: Apr. 27, 2018

(51) Int. Cl.
*G06F 11/14* (2006.01)
*G06F 16/11* (2019.01)

(52) U.S. Cl.
CPC ........ *G06F 11/1451* (2013.01); *G06F 16/128* (2019.01); *G06F 2201/80* (2013.01); *G06F 2201/82* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 7,849,057 B1* | 12/2010 | Kazar | ............... | G06F 17/30088 707/637 |
| 8,224,778 B1* | 7/2012 | Makin | ................. | G06F 11/1466 707/609 |
| 8,433,864 B1* | 4/2013 | Narayanan | .......... | G06F 11/1448 707/645 |
| 8,484,161 B2* | 7/2013 | Baker | ............... | G06F 17/30079 707/639 |
| 8,620,973 B1* | 12/2013 | Veeraswamy | ..... | G06F 17/30088 707/639 |
| 9,146,877 B2* | 9/2015 | Ezra | ...................... | G06F 3/0614 |
| 2008/0059894 A1* | 3/2008 | Cisler | ................. | G06F 11/1469 715/762 |
| 2012/0290802 A1* | 11/2012 | Wade | .................. | G06F 11/1471 711/162 |
| 2015/0127618 A1* | 5/2015 | Alberti | .............. | G06F 17/30088 707/678 |
| 2016/0314046 A1* | 10/2016 | Kumarasamy | ...... | G06F 11/1435 |
| 2017/0262520 A1* | 9/2017 | Mitkar | .............. | G06F 17/30581 |
| 2018/0089033 A1* | 3/2018 | Tamura | ............... | G06F 11/1451 |
| 2018/0137139 A1* | 5/2018 | Bangalore | ......... | G06F 17/30132 |
| 2018/0322160 A1* | 11/2018 | Horii | ................. | G06F 17/30368 |

* cited by examiner

*Primary Examiner* — Richard L Bowen
(74) *Attorney, Agent, or Firm* — Van Pelt, Yi & James LLP

(57) ABSTRACT

An indication of one or more changes to file system data since a last backup snapshot is received. One or more changes to the file system data between a requested backup version and the last backup snapshot are determined. One or more data blocks corresponding to the one or more changes to the file system data since the last backup snapshot and one or more data blocks corresponding to the one or more changes to file system data between the requested backup version and the last backup snapshot are provided to a primary system.

22 Claims, 11 Drawing Sheets

FAST AND OPTIMIZED RESTORE USING DELTA INFORMATION

BACKGROUND OF THE INVENTION

A backup snapshot represents the state of a primary system at a particular point in time. A full backup snapshot of a system may be composed of large amounts of data (e.g., terabytes, petabytes, etc.). Performing a full backup snapshot of a primary system at frequent intervals (e.g., hourly, daily) requires large amounts of storage to store the backup snapshots. To reduce the amount of storage required, an incremental backup snapshot of the primary system may be performed between full backup snapshots. An incremental backup snapshot includes the changes that have occurred to the primary system since the previous (full or incremental) backup snapshot. The backup snapshots may be stored at a secondary storage system. However, mounting a volume that includes a full backup snapshot and several incremental backup snapshots may require large amounts of storage at the secondary storage system and require a large amount of data to be transferred from the secondary storage system to the primary system.

For example, suppose a full backup snapshot of a primary system comprised of 1 TB of data was performed at t=0 and an incremental backup snapshot of 100 GB of data was performed at each t, from t=1 to t=10. Some of the data from an incremental backup snapshot may overwrite the data from the full backup snapshot and/or a previous incremental backup snapshot. However, to recover and mount the primary system at t=10 requires starting from the full backup snapshot at t=0 and adding each incremental backup snapshot to the primary system until the combined snapshots reproduce the state of the primary system at t=10. In this example, 2 TB of storage is required to recover the primary system comprised of 1 TB at t=10.

The above process requires a large amount of data to be transferred from a secondary storage system to the primary system. This requires time and resources (e.g., bandwidth). It would be useful to reduce the amount of time and resources required to recover the primary system to a particular point in time.

BRIEF DESCRIPTION OF THE DRAWINGS

Various embodiments of the invention are disclosed in the following detailed description and the accompanying drawings.

DETAILED DESCRIPTION

Figure 1:
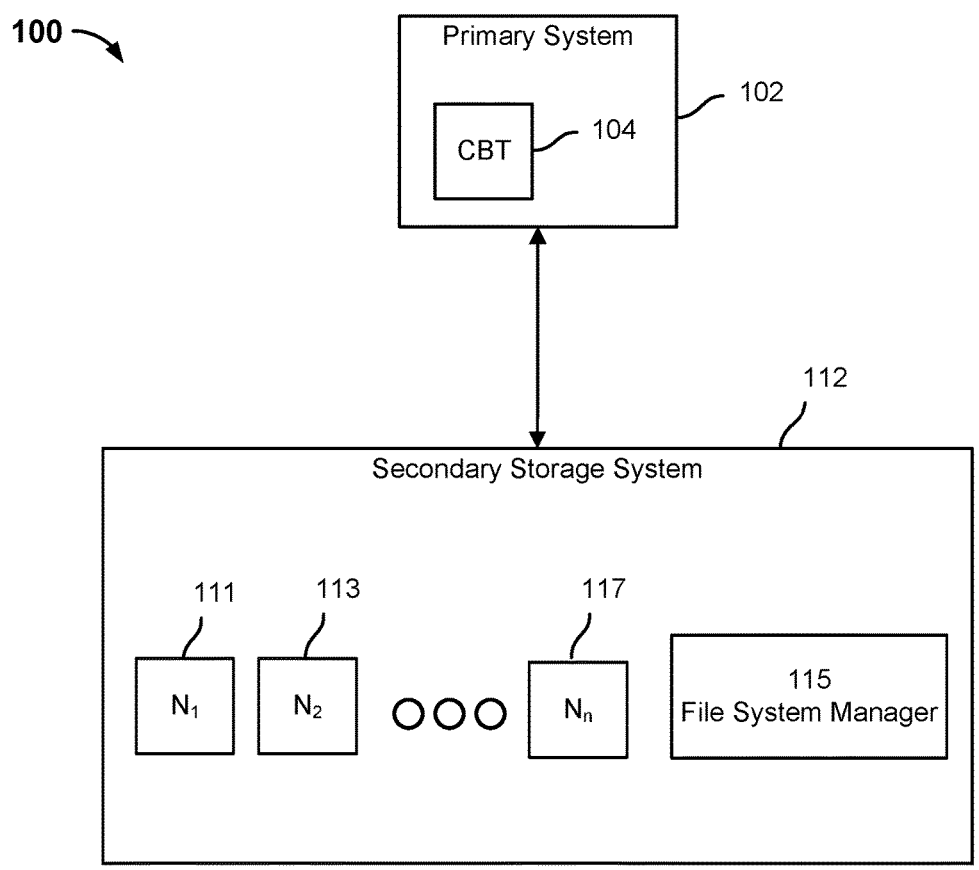
FIG. 1 is a block diagram illustrating an embodiment of a system for backing up and restoring data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A primary system comprises an object, virtual machine, physical entity, file system, array backup, and/or volume that stores file system data. The primary system may perform a backup snapshot according to a backup policy and store the backup snapshot to a secondary storage system. A backup snapshot represents the state of a system at a particular point in time (e.g., the state of the file system data). The backup policy may require a full backup snapshot and/or an incremental backup snapshot to be performed. A full backup snapshot stores the entire state of the primary system at a particular point in time. The file system data is comprised of a plurality of data blocks. The primary system may include a change block tracker that monitors and identifies one or more data blocks of the primary system that have changed (e.g., modified, deleted, added) since the last backup snapshot. An incremental backup snapshot stores the one or more data blocks that have changed since the last backup snapshot.

The object, virtual machine, physical entity, file system, array backup, and/or volume of the primary system may become corrupted. In some embodiments, a portion of the object, virtual machine, physical entity, file system, array backup, and/or volume of the primary system is corrupted.

In other embodiments, the entire object, virtual machine, physical entity, file system, array backup, and/or volume of the primary system is corrupted. A user of the primary system may indicate that the primary system is to be restored to a particular moment in time where the particular moment in time has a corresponding backup snapshot. The data associated with the selected backup snapshot may be provided from the secondary storage system to the primary storage system. However, the non-corrupted portion of the object, virtual machine, physical entity, file system, array backup, and/or volume of the primary system may already store some of the data associated with the backup snapshot. Sending from the secondary storage system to the primary system one or more data blocks that are already stored on the object, virtual machine, physical entity, file system, array backup, and/or volume of the primary system is a waste of time and resources. Time and bandwidth is wasted when duplicative data blocks are sent from the secondary storage system to the primary system.

Recovery Time Objective (RTO) is one of the most important parameters of a disaster recovery or data protection plan. The RTO is the duration of time and service level within which a business process must be restored after a disaster in order to avoid unacceptable consequences associated with a break in continuity.

The amount of time and resources needed to restore a corrupted object, virtual machine, physical entity, file system, array backup, and/or volume of a primary system to a particular moment in time may be reduced and recovery time objectives may be satisfied through the use of fully hydrated backup snapshots. A fully hydrated backup snapshot is a backup that is almost instantaneously accessible (e.g., a few seconds) and does not require rehydration. A fully hydrated snapshot backup may provide a complete view of storage object, virtual machine, physical entity, file system, array backup, and/or volume of the primary system, regardless if the backup snapshot is a full backup snapshot or an incremental backup snapshot.

The one or more data blocks of a backup snapshot that are stored on a secondary storage system may be organized using a tree data structure. An example of the tree data structure is a snapshot tree (e.g., Cohesity Snaptree), which may be based on a B+ tree structure (or other type of tree structure in other embodiments). The snapshot tree enables a snapshot backup to be a fully hydrated snapshot backup. The snapshot tree may be used to capture different versions of file system data at different moments in time. For example, a first snapshot tree may correspond to a first backup snapshot and a second snapshot tree may correspond to a second backup snapshot. In some embodiments, the tree data structure allows a chain of snapshot trees (i.e., different snapshot tree versions) to be linked together by allowing a node of a later version of a snapshot tree to reference a node of a previous version of a snapshot tree (e.g., a "snapshot tree forest"). For example, a node of the second snapshot tree corresponding to the second backup snapshot may reference a node of the first snapshot tree corresponding to the first backup snapshot.

A snapshot tree includes a root node, one or more levels of one or more intermediate nodes associated with the root node, and one or more leaf nodes associated with an intermediate node of the lowest intermediate level. A root node or an intermediate node of a version of a snapshot tree may reference an intermediate node or a leaf node of a previous version of a snapshot tree. The root node of a snapshot tree includes one or more pointers to one or more intermediate nodes. Each intermediate node includes one or more pointers to other nodes (e.g., a lower intermediate node or a leaf node). Each time a backup snapshot is received by the secondary storage system, a corresponding snapshot tree is created. The corresponding snapshot tree is created by cloning the last snapshot tree. Cloning the last snapshot tree includes creating a new root node where the new root node includes the set of pointers included in the root node of the last snapshot tree, that is, the new root node includes one or more pointers to an intermediate node or leaf node associated with the last snapshot tree. The new root node also includes a view identifier (e.g., TreeID) that is different than the view identifier of the last root node. Each node of a snapshot tree has a corresponding view identifier. The view identifier associated with a node identifies a view with which the node is associated, e.g., the associated backup snapshot. A leaf node may store file system metadata, one or more data blocks, an identifier of one or more data blocks, a pointer to a file tree, or a pointer to a data block stored on the secondary storage system. A leaf node may correspond to a data brick. The data brick may have a corresponding brick number.

The file system data of the primary system may be segmented into a plurality of data bricks. A data brick may be comprised of one or more data blocks. A leaf node of a snapshot tree corresponds to a data brick. A write to the file system data may occur since a last backup snapshot, such that a portion of a data brick is modified (e.g., one of the one or more data blocks comprising the data brick is modified). When a subsequent backup snapshot is performed, the snapshot tree corresponding to the subsequent backup snapshot is modified to reflect the data brick modification. The snapshot tree corresponding to the subsequent backup snapshot is traversed from the new root node to the leaf node corresponding to the data brick that was modified. When traversing the snapshot tree corresponding to the subsequent backup snapshot the view identifier associated with a node is compared to the view identifier associated with the root node of the subsequent backup snapshot. In the event the view identifier associated with the node does not match the view identifier associated with the root node of the subsequent backup snapshot, a copy of the non-matching node is created. The node copy includes the same set of pointers as the non-matching node, but includes a view identifier that is the same as the root node of the subsequent backup snapshot. A pointer of the node that points to the non-matching node is updated to point to the node copy instead of the non-matching node. When the leaf node corresponding to the data brick that was modified is reached, a copy of the leaf node is created. A pointer of the leaf node is updated to point to the modified data brick instead of the data brick that was modified. A pointer of a node that references the leaf node that was copied is updated to point to the leaf node copy.

The manner in which a snapshot tree is modified as described above allows data bricks that were modified since a previous backup snapshot to be easily identified. For example, a first snapshot tree may be associated with a first backup snapshot. The first backup snapshot may be a full backup snapshot. Thus, each node of the first snapshot tree has a view identifier (e.g., TreeID=1) that indicates the node is associated with the first backup snapshot. A second snapshot tree may be associated with a second backup snapshot. The second backup snapshot may be an incremental backup snapshot. The second snapshot tree corresponding to the second backup snapshot may have one or more nodes associated with the first backup snapshot and one or more nodes associated with the second backup snapshot. The one or more nodes associated with the second backup snapshot may be identified based on the view identifier. In the event the view identifier of a node matches the view identifier of the root node associated with the second backup snapshot, then the node is associated with the second backup snapshot. A nth snapshot tree may be associated with a nth backup snapshot. The nth backup snapshot may be an incremental backup snapshot. Each of the backup snapshots between the second backup snapshot and the nth backup snapshot may also be incremental backup snapshots. The nth snapshot tree corresponding to the nth backup snapshot may have one or more nodes associated with the first backup snapshot, one or more nodes associated with the second backup snapshot, one or more nodes associated with the backup snapshots between the second backup snapshot and the nth backup snapshot, and/or one or more nodes associated with the nth backup snapshot. The one or more nodes associated with the nth backup snapshot may be identified based on the view identifier. In the event the view identifier of a node matches the view identifier of the root node associated with the nth backup snapshot, then the node is associated with the nth backup snapshot.

The primary system may be restored to a backup version by determining the one or more data blocks that have changed since a last backup snapshot and determining the one or more data blocks that have changed between the last backup snapshot and the backup snapshot version.

The one or more data blocks that have changed since a last backup snapshot may be determined by a change block tracker of the primary system. A change block tracker of the primary system is configured to track the one or more changes to the file system data since a last backup snapshot. The change block tracker may be configured to store an identification of the one or more data blocks of the file system data that have changed since the last backup snapshot. The one or more data blocks that have changed since the last backup snapshot have a corresponding data bricks. The snapshot tree associated with the last backup snapshot is traversed to identify a location of the data bricks corresponding to the one or more data blocks that have changed since the last backup snapshot. The data bricks comprising the one or more data blocks that have changed since the last backup snapshot are provided to the primary system.

The one or more data blocks that have changed between the last backup snapshot and the backup snapshot version may be determined by traversing a snapshot tree associated with the last backup snapshot and traversing the snapshot tree associated with the backup snapshot version. The one or more leaf nodes that are included in the snapshot tree associated with the backup snapshot version, but are not included in the snapshot tree associated with the last backup snapshot are determined. The determined leaf nodes correspond to data bricks. The data bricks correspond to the one or more data blocks that have changed between the last backup snapshot and the backup snapshot version. The data bricks comprising the one or more data blocks that have changed between the last backup snapshot and the backup snapshot version are provided to the primary system.

In response to receiving the data bricks comprising the one or more data blocks that have changed since the last backup snapshot and the data bricks comprising the one or more data blocks that have changed between the last backup snapshot and the backup snapshot version the primary system may apply the data blocks to restore the primary system to the particular backup version moment in time.

Such an approach reduces the amount of time and resources needed to restore a corrupted object, virtual machine, physical entity, file system, array backup, and/or volume of a primary system to a particular moment in time and helps to ensure that recovery time objectives are satisfied because the amount of data that needs to be provided to recover the primary system to a particular backup version is significantly reduced. Instead of providing a full backup and one or more incremental backups as provided by conventional methods, the one or more data blocks that the primary system currently does not store are provided.

FIG. 1 is a block diagram illustrating an embodiment of a system for backing up and restoring data. In the example shown, system 100 includes a primary system 102 and a secondary storage system 112.

Primary system 102 is a computing system that stores file system data. The file system data may be stored across one or more object(s), virtual machine(s), physical entity/entities, file system(s), array backup(s), and/or volume(s) of the primary system 102. Primary system 102 may be comprised of one or more servers, one or more computing devices, one or more storage devices, and/or a combination thereof. Primary system 102 may be configured to backup file system data to secondary storage system 112 according to one or more backup policies. In some embodiments, a backup policy indicates that file system data is to be backed up on a periodic basis (e.g., hourly, daily, weekly, monthly, etc.). In other embodiments, a backup policy indicates that file system data is to be backed up when a threshold size of data has changed. In other embodiments, a backup policy indicates that file system data is to be backed up upon a command from a user associated with primary system 102. The backup policy may indicate when a full backup snapshot is to be performed and when an incremental backup snapshot is to be performed. For example, the backup policy may indicate that a full backup snapshot is to be performed according to a first schedule (e.g., weekly, monthly, etc.) and an incremental backup snapshot is to be performed according to a second schedule (e.g., hourly, daily, weekly, etc.) The backup policy may indicate that a full backup snapshot is to be performed after a threshold number of incremental backup snapshots have been performed.

Primary system 102 may include change block tracker 104. The file system data stored on primary system 102 is comprised of one or more data blocks. Change block tracker 104 is configured to monitor the one or more data blocks and store an indication of when one of the one or more data blocks has been modified. Change block tracker 104 may receive one or more data blocks associated with one or more files in route to being stored in one or more object(s), virtual machine(s), physical entity/entities, file system(s), array backup(s), and/or volume(s) of primary system 102. A change block tracker is configured to maintain a map of the one or more changes to the file system data. The map may include the one or more data blocks that were changed, the values associated with the one or more changed data blocks, and an associated timestamp. The map may include a sequence in which the changes were made. In the event primary system 102 performs a backup snapshot (either full or incremental), change block tracker 104 is configured to clear (e.g., empty) the map of the one or more data blocks that have been modified.

Primary system 102 is configured to send one or more data blocks associated with a backup snapshot to secondary storage system 112. The backup snapshot may be a full backup snapshot or an incremental backup snapshot. In the event the backup snapshot is a full backup snapshot, the data blocks of the entire one or more object(s), virtual machine(s), physical entity/entities, file system(s), array backup(s), and/or volume(s) are sent to secondary storage system 112. In the event the backup snapshot is an incremental backup snapshot, the data blocks that were modified since the last backup snapshot (full or incremental) are sent to secondary storage system 112.

The one or more data blocks may be sent from primary system 102 to secondary storage system 112 over a network. The network may be one or more of the following: a local area network, a wide area network, a wired network, a wireless network, the Internet, an intranet, or any other appropriate communication network.

Secondary storage system 112 is a storage system configured to backup and store file system data received from primary storage system 102. Secondary storage system 112 is configured to store the file system data and organize the file system data in a tree data structure. An example of the tree data structure is a snapshot tree (e.g., Cohesity Snaptree), which may be based on a B+ tree structure (or other type of tree structure in other embodiments). The snapshot tree enables a snapshot backup to be a fully hydrated snapshot backup. The snapshot tree may be used to capture different versions of file system data at different moments in time. For example, a first snapshot tree may correspond to a first backup snapshot and a second snapshot tree may correspond to a second backup snapshot. In some embodiments, the tree data structure allows a chain of snapshot trees (i.e., different snapshot tree versions) to be linked together by allowing a node of a later version of a snapshot tree to reference a node of a previous version of a snapshot tree (e.g., a "snapshot tree forest"). For example, a node of the second snapshot tree corresponding to the second backup snapshot may reference a node of the first snapshot tree corresponding to the first backup snapshot.

Secondary storage system 112 may be comprised of one or more solid state drives, one or more hard disk drives, or a combination thereof. Secondary storage system 112 may include a file system manager 115. File system manager 115 is configured to maintain file system data in the form of nodes arranged in a tree data structure. In some embodiments, leaf nodes in the file system tree include key-value pairs that associate data keys with values in the form of particular items of file system data. File system manager 115 may be configured to perform one or more modifications, as disclosed herein, to a snapshot tree.

Secondary storage system 112 is comprised of a plurality of N storage nodes 111, 113, 117. In some embodiments, N is an odd number. Secondary storage system 112 may receive a backup snapshot (e.g., full or incremental) from primary system 102. The backup snapshot represents the state of primary system 102 at a particular moment in time. Secondary storage system 112 may store the one or more data blocks associated with a backup snapshot across the plurality of nodes 111, 113, 115.

Figure 2A:
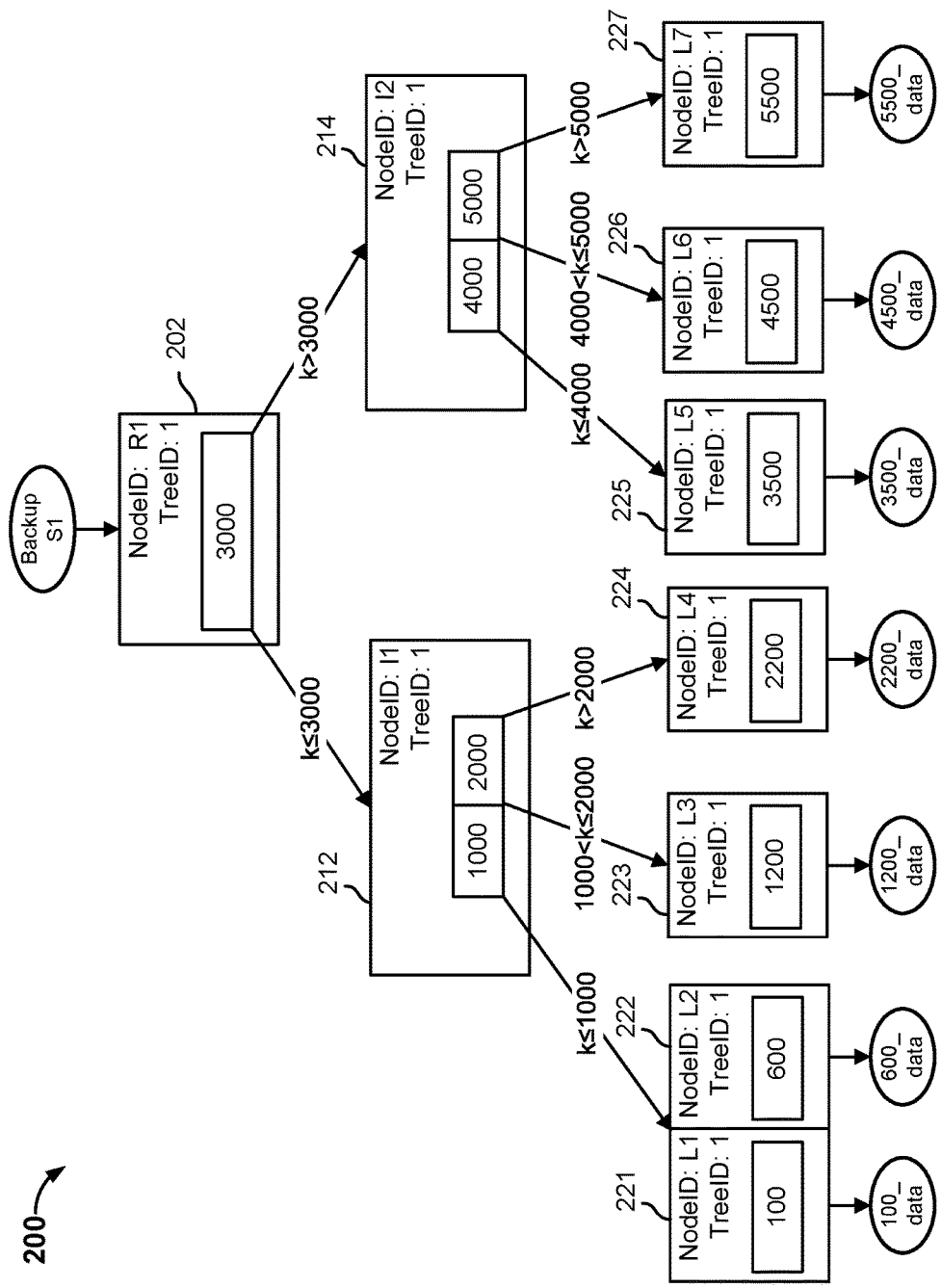
FIG. 2A is a diagram illustrating an embodiment of a tree data structure storing file system data.

FIG. 2A is a diagram illustrating an embodiment of a tree data structure storing file system data. In the example shown, tree data structure 200 may be created by a file system manager, such as file system manager 115 of secondary storage system 112. The file system data of a primary system, such as primary system 102 may be backed up to a secondary storage system, such as secondary storage system 112. The primary system may perform a backup snapshot to back up the file system data. The backup snapshot may correspond to a full backup snapshot or an incremental backup snapshot. The manner in which the file system data is stored in secondary storage system may be represented by a corresponding tree data structure, such as tree data structure 200.

In the example shown, tree data structure is a snapshot tree that includes a root node 202, intermediate nodes 212, 214, and leaf nodes 221, 222, 223, 224, 225, 226, 227. Although tree data structure 200 includes one intermediate level between root node 202 and leaf nodes 221, 222, 223, 224, 225, 226, 227, there could be any number of intermediate levels in a snapshot tree. Tree data structure 200 may be a snapshot tree of file system data at a particular point in time t and correspond to a particular version of a snapshot tree. The tree data structure may correspond to a backup snapshot. For example, tree data structure 200 may correspond to "Backup S1" of file system data.

Root node 202 is associated with the snapshot of the file system data at a particular point in time t, i.e., a particular backup snapshot version. In some embodiments, the file system data is metadata for a distributed file system and may include information, such as file size, directory structure, file permissions, physical storage location of the files, etc.

A root node is the root of a snapshot tree and may include pointers to one or more other nodes. Each pointer includes a range of numerical and sorted data keys that can be found by following that particular pointer. An intermediate node is a node to which another node points (e.g., root node, other intermediate node) and includes one or more pointers to one or more other nodes. A leaf node is a node at the bottom of a snapshot tree. In some embodiments, a leaf node is a node to which another node points, but does not include a pointer to any other node. In other embodiments, a leaf node is a node to which another node points and includes a pointer to the root node of another snapshot tree (e.g., file tree). A leaf node may store key-value pairs of file system data. A data key k is a lookup value by which a particular leaf node may be accessed. A file may be comprised of one or more data blocks. The file may be divided into a plurality of equal size blocks called bricks. The lookup value may correspond to a brick number. For example, "100" is a data key that may be used to lookup "100 data" of leaf node 221. Examples of values stored by a leaf node include, but are not limited to, file size, directory structure, file permissions, physical storage locations of the files, etc. A leaf node may store a data key k and a pointer to a location that stores the value associated with the data key. The value may correspond to a data brick comprising one or more data blocks.

A root node or an intermediate node may include one or more node keys. The node key may be an integer value or a non-integer value. The node key may correspond to a brick number. Each node key indicates a division between the branches of the node and indicates how to traverse the tree data structure to find a leaf node, i.e., which pointer to follow. For example, root node 202 may include a node key of "3000." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "100," "600," "1200," or "2200," the first branch of root node 202 would be traversed to intermediate node 212 because the data keys of "100," "600," "1200," and "2200" are less than or equal to the node key "3000." To find a leaf node storing a value associated with a data key of "3500," "4500," or "5500," the second branch of root node 202 would be traversed to intermediate node 214 because data keys "3500," "4500," and "5500" are greater than the node key of "3000."

In some embodiments, a hash function may determine which branch of a node with which the non-numerical data key is associated. For example, a hash function may determine that a first bucket is associated with a first branch of a node and a second bucket is associated with a second branch of the node.

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "4000." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the backup snapshot/view with which the node is associated. When a change is made to data associated with a leaf node as described with respect to FIGS. 2B, 2C, and 2D, the TreeID may be used to determine which backup snapshot the change is associated (i.e., when did the change occur).

Root node 202 includes a node key that divides a set of pointers into two different subsets. Leaf nodes (e.g., L1, L2, L3, L4) with a data key k that is less than or equal to the node key are associated with a first branch and leaf nodes (e.g., L5, L6, L7) with a data key k that is greater than the node key are associated with a second branch. Leaf nodes with a data key of "100," "600," "1200," or "2200" may be found by traversing tree data structure 200 from root node 202 to intermediate node 212 because the data keys have a value that is less than or equal to the node key. Leaf nodes with a data key of "3500," "4500," or "5500" may be found by traversing tree data structure 200 from root node 202 to intermediate node 214 because the data keys have a value that is greater than the node key.

Root node 202 includes a first set of pointers. The first set of pointers associated with a data key less than the node key (e.g., "100", "600," or "1200") indicates that traversing tree data structure 200 from root node 202 to intermediate node 212 will lead to a leaf node with a data key of "100," "600," "1200," or "2200." Intermediate node 214 includes a second set of pointers. The second set of pointers associated with a data key greater than the node key indicates that traversing tree data structure 200 from root node 202 to intermediate node 214 will lead to a leaf node with a data key of "3500," "4500," or "5500."

Intermediate node 212 includes pointers to leaf nodes 221, 222, 223, 224. Intermediate node 212 includes a NodeID of "I1" and a TreeID of "1." Intermediate node 212 includes a first node key of "1000" and a second node key of "2000." The data key k for leaf nodes 221, 222 is a value that is less than or equal to the first node key. The data key k for leaf node 223 is a value that is greater than the first node key and less than or equal to the second node key. The data key k for leaf node 224 is a value that is greater than the second node key. The pointer to leaf nodes 221, 222 indicates that traversing tree data structure 200 from intermediate node 212 to leaf nodes 221, 222 will lead to the node with a data key of "100" or "600." The pointer to leaf node 223 indicates that traversing tree data structure 200 from intermediate node 212 to leaf node 223 will lead to the node with a data key of "1200." The pointer to leaf node 224 indicates that traversing tree data structure 200 from intermediate node 212 to leaf node 224 will lead to the node with a data key of "2200."

Intermediate node 214 includes pointers to leaf nodes 225, 226, 227. Intermediate node 212 includes a NodeID of "I2" and a TreeID of "1." Intermediate node 214 includes a first node key of "4000" and a second node key of "5000." The data key k for leaf node 225 is a value that is less than or equal to the first node key. The data key k for leaf node 226 is a value that is greater than the first node key and less than or equal to the second node key. The data key k for leaf node 227 is a value that is greater than the second node key. The pointer to leaf node 225 indicates that traversing tree data structure 200 from intermediate node 214 to leaf node 225 will lead to the node with a data key of "3500." The pointer to leaf node 226 indicates that traversing tree data structure 200 from intermediate node 214 to leaf node 226 will lead the node with a data key of "4500." The pointer to leaf node 227 indicates that traversing tree data structure 200 from intermediate node 214 to leaf node 227 will lead the node with a data key of "5500."

A file may be comprised of a plurality of data blocks. The file may be divided into a plurality of fixed size data blocks called bricks. Information associated with a brick for a file may be kept in the tree data structure. For example, a leaf node may correspond to a brick and include a pointer to a location of the corresponding one or more data blocks stored in the brick. Given an offset in a file, the brick number may be determined by dividing the file offset by a brick size. The brick number may correspond to a data key k for a leaf node.

Leaf node 221 includes a data key of "100," which corresponds to brick number 100. Leaf node 221 also includes a pointer to the corresponding data brick "100 data." Leaf node 221 also includes NodeID of "L1" and a TreeID of "1." To view the data brick associated with a data key of "100," tree data structure 200 is traversed from root node 202 to intermediate node 212 to leaf node 221.

Leaf node 222 includes a data key of "600," which corresponds to brick number 600. Leaf node 222 also includes a pointer to the corresponding data brick "600 data." Leaf node 222 also includes NodeID of "L2" and a TreeID of "1." To view the data brick associated with a data key of "600," tree data structure 200 is traversed from root node 202 to intermediate node 212 to leaf node 222.

Leaf node 223 includes a data key of "1200," which corresponds to brick number 1200. Leaf node 223 also includes a pointer to the corresponding data brick "1200 data." Leaf node 223 also includes NodeID of "L3" and a TreeID of "1." To view the data brick associated with a data key of "1200," tree data structure 200 is traversed from root node 202 to intermediate node 212 to leaf node 223.

Leaf node 224 includes a data key of "2200," which corresponds to brick number 2200. Leaf node 224 also includes a pointer to the corresponding data brick "2200 data." Leaf node 224 also includes NodeID of "L4" and a TreeID of "1." To view the data brick associated with a data key of "2200," tree data structure 200 is traversed from root node 202 to intermediate node 212 to leaf node 224.

Leaf node 225 includes a data key of "3500," which corresponds to brick number 3500. Leaf node 225 also includes a pointer to the corresponding data brick "3500 data." Leaf node 225 also includes NodeID of "L5" and a TreeID of "1." To view the data brick associated with a data key of "3500," tree data structure 200 is traversed from root node 202 to intermediate node 214 to leaf node 225.

Leaf node 226 includes a data key of "4500," which corresponds to brick number 4500. Leaf node 226 also includes a pointer to the corresponding data brick "4500 data." Leaf node 226 also includes NodeID of "L6" and a TreeID of "1." To view the data brick associated with a data key of "4500," tree data structure 200 is traversed from root node 202 to intermediate node 214 to leaf node 226.

Leaf node 227 includes a data key of "5500," which corresponds to brick number 5500. Leaf node 227 also includes a pointer to the corresponding data brick "5500 data." Leaf node 227 also includes NodeID of "L7" and a TreeID of "1." To view the data brick associated with a data key of "5500," tree data structure 200 is traversed from root node 202 to intermediate node 214 to leaf node 227.

Figure 2B:
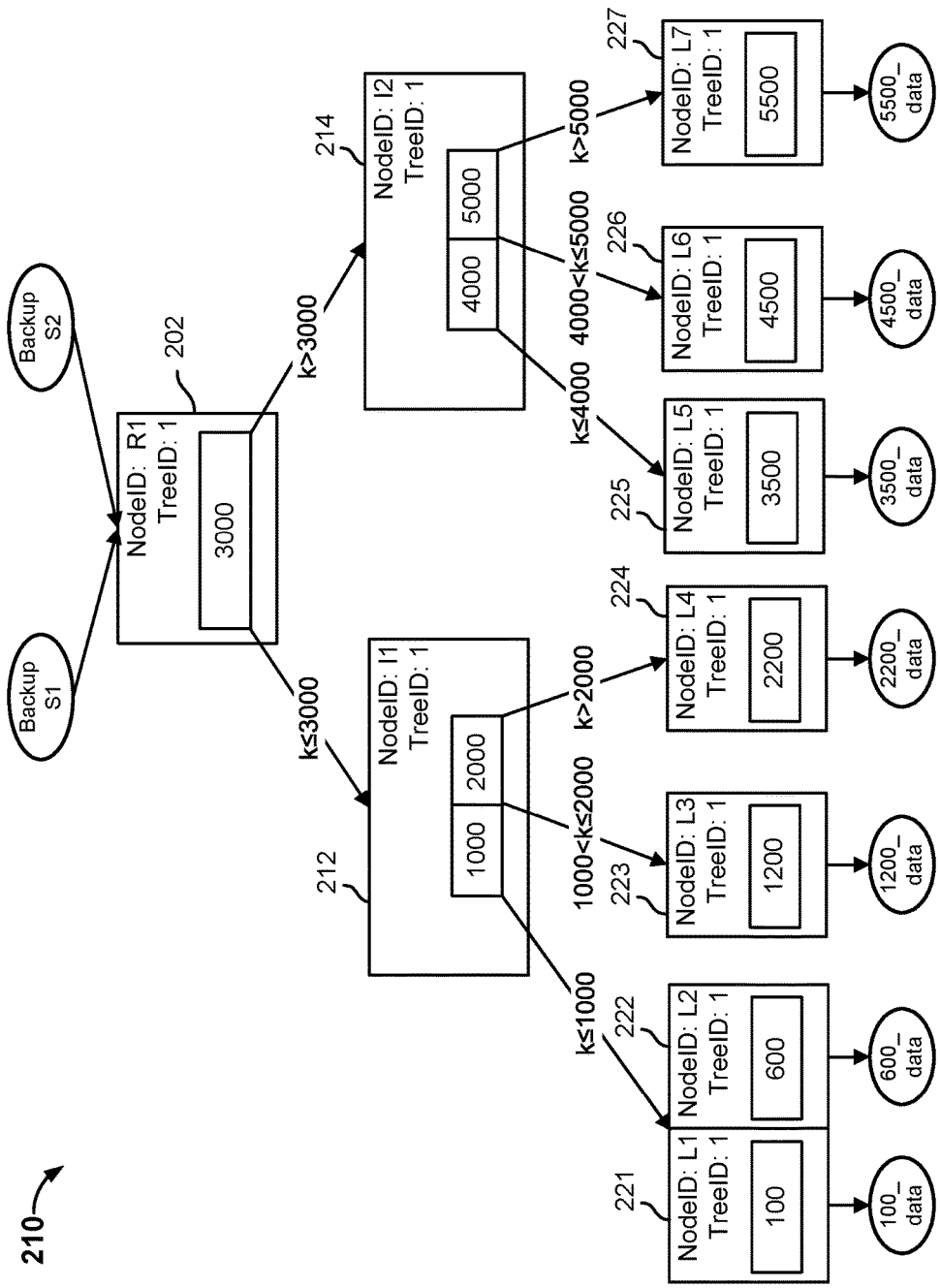
FIG. 2B is a diagram illustrating an embodiment of cloning a snapshot tree of a tree data structure.

FIG. 2B is a diagram illustrating an embodiment of cloning a snapshot tree of a tree data structure. In some embodiments, tree data structure 210 may be created by a file system manager, such as file system manager 115 of secondary storage system 112. The file system data of a primary system, such as primary system 102, may be backed up to a secondary storage system, such as secondary storage system 112. A subsequent backup snapshot may correspond to a full backup snapshot or an incremental backup snapshot. The manner in which the file system data corresponding to the subsequent backup snapshot is stored in secondary storage system may be represented by a tree data structure. The tree data structure corresponding to the subsequent backup snapshot is created by cloning a snapshot tree associated with a last backup.

In the example shown, tree data structure 210 includes root node 202, intermediate nodes 212, 214, and leaf nodes 221, 222, 223, 224, 225, 226, and 227. Root node 202, intermediate nodes 212, 214, and leaf nodes 221, 222, 223, 224, 225, 226, and 227 are associated with a last backup snapshot, for example, "Backup S1." When a new backup snapshot is performed, e.g., "Backup S2," a clone of a last snapshot tree is generated. The clone of the last snapshot tree may be generated by causing the new backup snapshot to point to a root node associated with the last backup snapshot. In the example shown, the new backup "Backup S2" initially points to root node 202, which is the root node associated with the last backup snapshot "Backup S1."

Figure 2C:
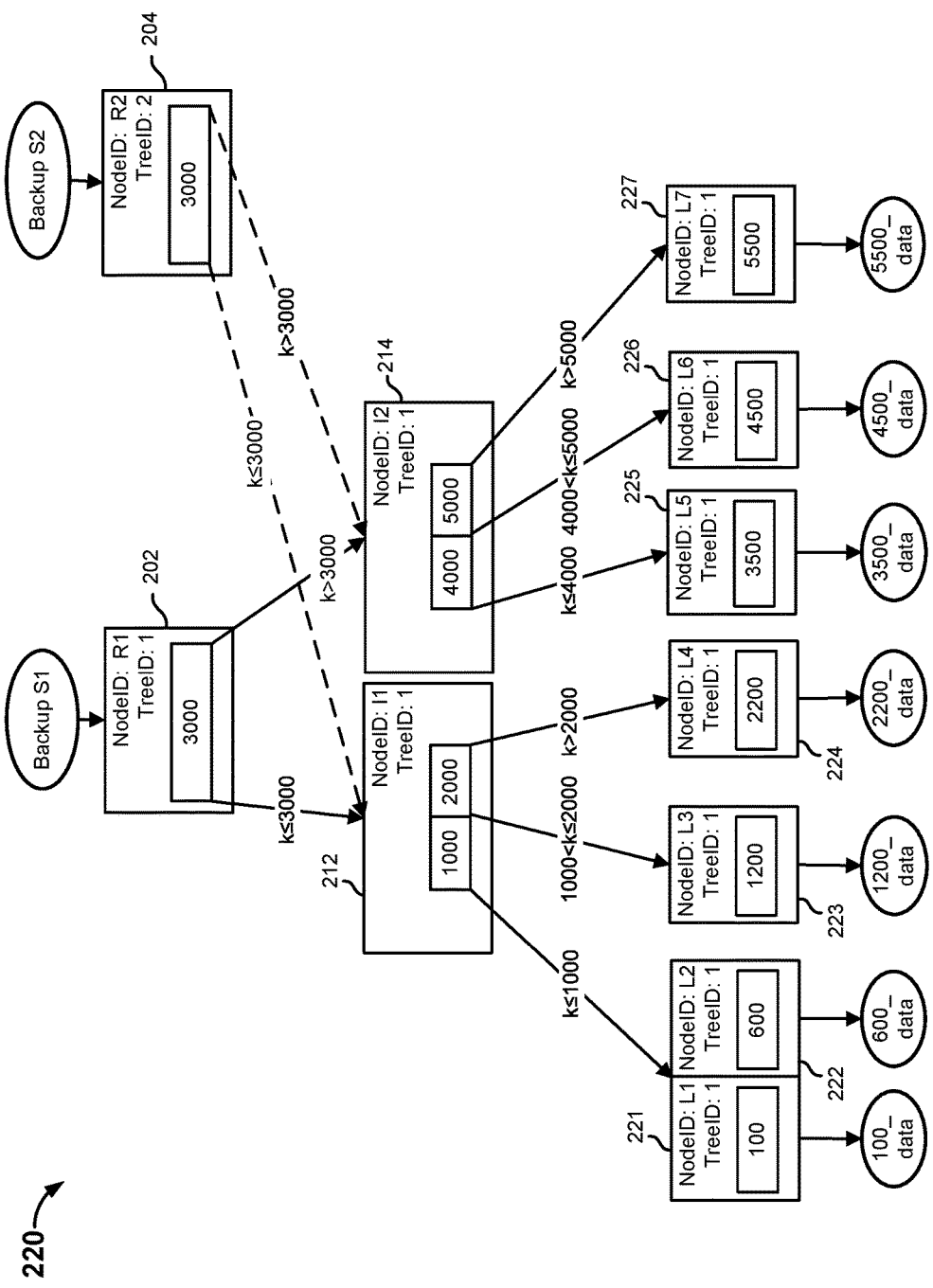
FIG. 2C is a diagram illustrating an embodiment of a modified cloned snapshot tree.

FIG. 2C is a diagram illustrating an embodiment of a modified cloned snapshot tree. In the example shown, tree data structure 220 may be modified by a file system manager, such as file system manager 115. One or more files stored on a primary system may be added, modified, and/or deleted since a last backup snapshot. A subsequent backup snapshot corresponding to the one or more changes to the one or more files may be performed after the last backup and stored at a secondary storage system, such as secondary storage system 112. The one or more changes to the one or more files included in the subsequent backup snapshot may be represented in a corresponding snapshot tree. The one or more changes since a last backup snapshot may be represented in a snapshot tree by initially cloning the snapshot tree corresponding to the last backup, for example, as shown above in FIG. 2B.

The cloned snapshot tree may be modified in a manner that corresponds to the one or more changes to the primary system since the last backup snapshot. To indicate that the one or more changes to the primary system are associated with a subsequent backup snapshot and not associated with the last backup snapshot, a new root node is created. The new root node initially includes the set of pointers included in the root node associated with the last backup snapshot, that is, the new root node includes one or more pointers to an intermediate node or leaf node associated with a previous snapshot tree. However, the new root node includes a view identifier (e.g., TreeID) that is different than the view identifier (e.g., TreeID) of the previous root node. In the example shown, root node 204 has been created and includes pointers to intermediate nodes 212, 214. Root node 204 includes a NodeID of "R2" and a TreeID of "2."

Figure 2D:
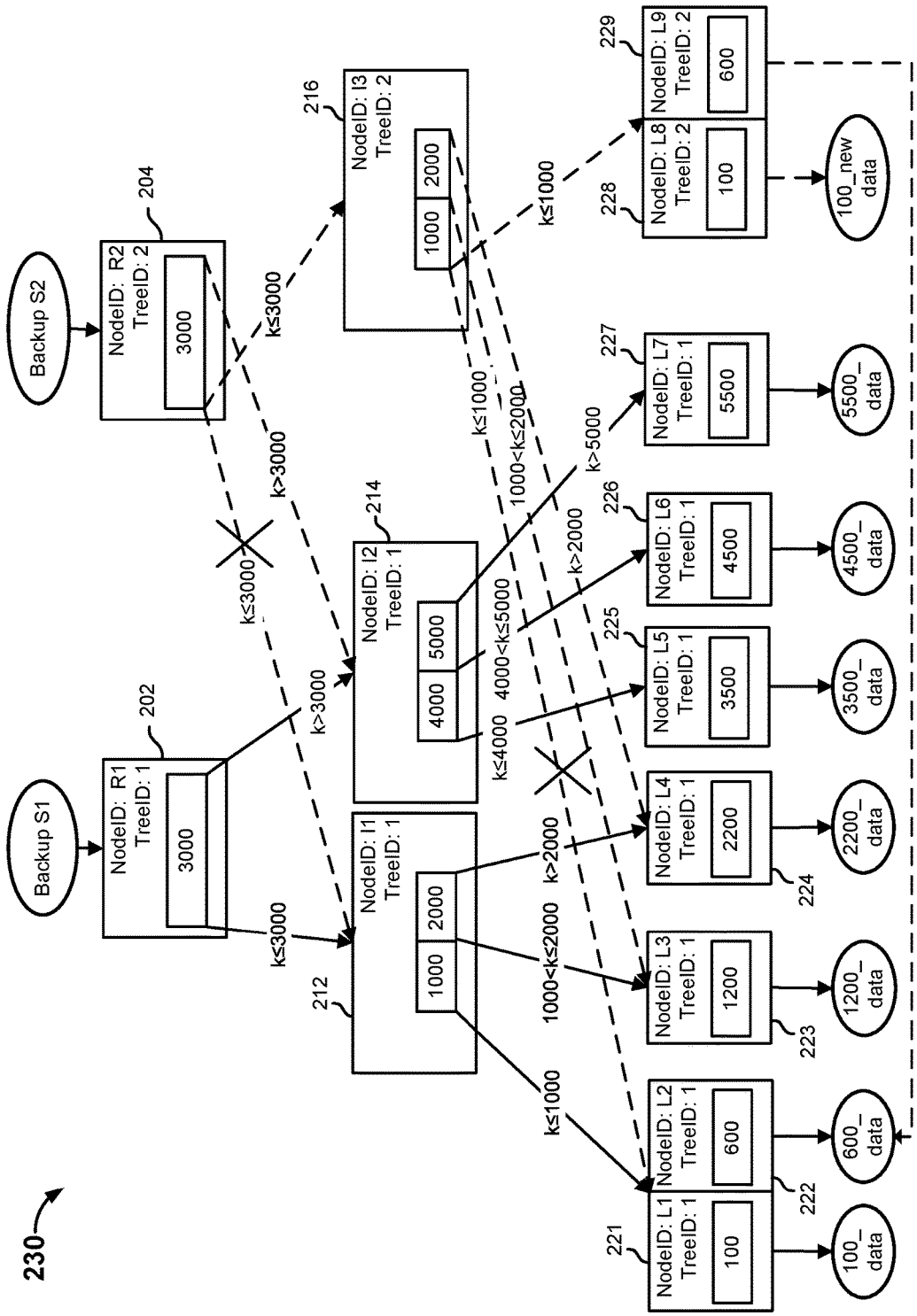
FIG. 2D is a diagram illustrating an embodiment of a modified cloned snapshot tree.

FIG. 2D is a diagram illustrating an embodiment of a modified cloned snapshot tree. In the example shown, tree data structure 230 may be modified by a file system manager, such as file system manager 115.

The one or more changes to the primary system since the last backup snapshot may include a modification to a data block. For example, a data value included in the data block may have been modified. The data block modification may be represented in the tree data structure. A data brick comprises the modified data block. The snapshot tree may be modified to indicate that the data brick comprising the modified data block has changed.

In the example shown, the data brick of "100 data" has been modified to "100 new data" since the last backup snapshot. The snapshot tree corresponding to the subsequent backup snapshot is modified to reflect the modification. As described above, a clone of the last snapshot tree corresponding to the last backup snapshot is performed to generate a snapshot tree corresponding to a subsequent backup snapshot. A new root node corresponding to the subsequent backup snapshot is generated. The new root node includes the same pointers as the root node associated with the last backup snapshot. To modify the snapshot tree associated with the subsequent backup snapshot to reflect that the data brick of "100 data" has been modified to "100 new data," the file system manager traverses the snapshot tree associated the subsequent backup snapshot to identify the data brick associated with the data block. The file system manager starts at root node 204 because that is the root node of the snapshot tree associated with the subsequent backup snapshot. The file system manager traverses tree data structure 240 until it reaches a target node, in this example, leaf node 221. The file system manager compares the view identifier at each traversed intermediate node and leaf node with the view identifier of the root node. In the event the view identifier of a node matches the view identifier of the root node, the file system manager proceeds to the next node. In the event the view identifier of a node does not match the view identifier of the root node, a shadow copy of the node with the non-matching view identifier is made.

For example, to reach a leaf node with a data key of "100," the file system manager begins at root node 204 and proceeds to intermediate node 212. The file system manager compares the view identifier of intermediate node 212 with the view identifier of root node 204, determines that the view identifier of intermediate node 212 does not match the view identifier of root node 204, and creates a copy of intermediate node 212. The intermediate node copy 216 includes the same set of pointers as intermediate node 212, but includes a view identifier of "2" to match the view identifier of root node 204. The file system manager updates a set of pointers of root node 204 to point to intermediate node 216 instead of pointing to intermediate node 212. The file system manager traverses tree data structure 230 from intermediate node 216 to leaf node 221, determines that the view identifier of leaf node 221 does not match the view identifier of root node 204, and creates a copy of leaf node 221. Leaf node copy 228 includes the same view identifier as root node 204, has a new datakey of "100," and includes a pointer to a location of the data block "100 new data." The file system manager updates a pointer of intermediate node 216 to point to leaf node 228 instead of pointing to leaf node 221.

In some embodiments, the file system manager creates a shadow copy of one or more nodes associated a pointer. For example, the file system manager traversed tree data structure 240 from intermediate node 216 to leaf node 221. The file system manager may create a shadow copy of the one or more nodes to which intermediate node 216 points when k<1000 (e.g., leaf nodes 221, 221).

Figure 2E:
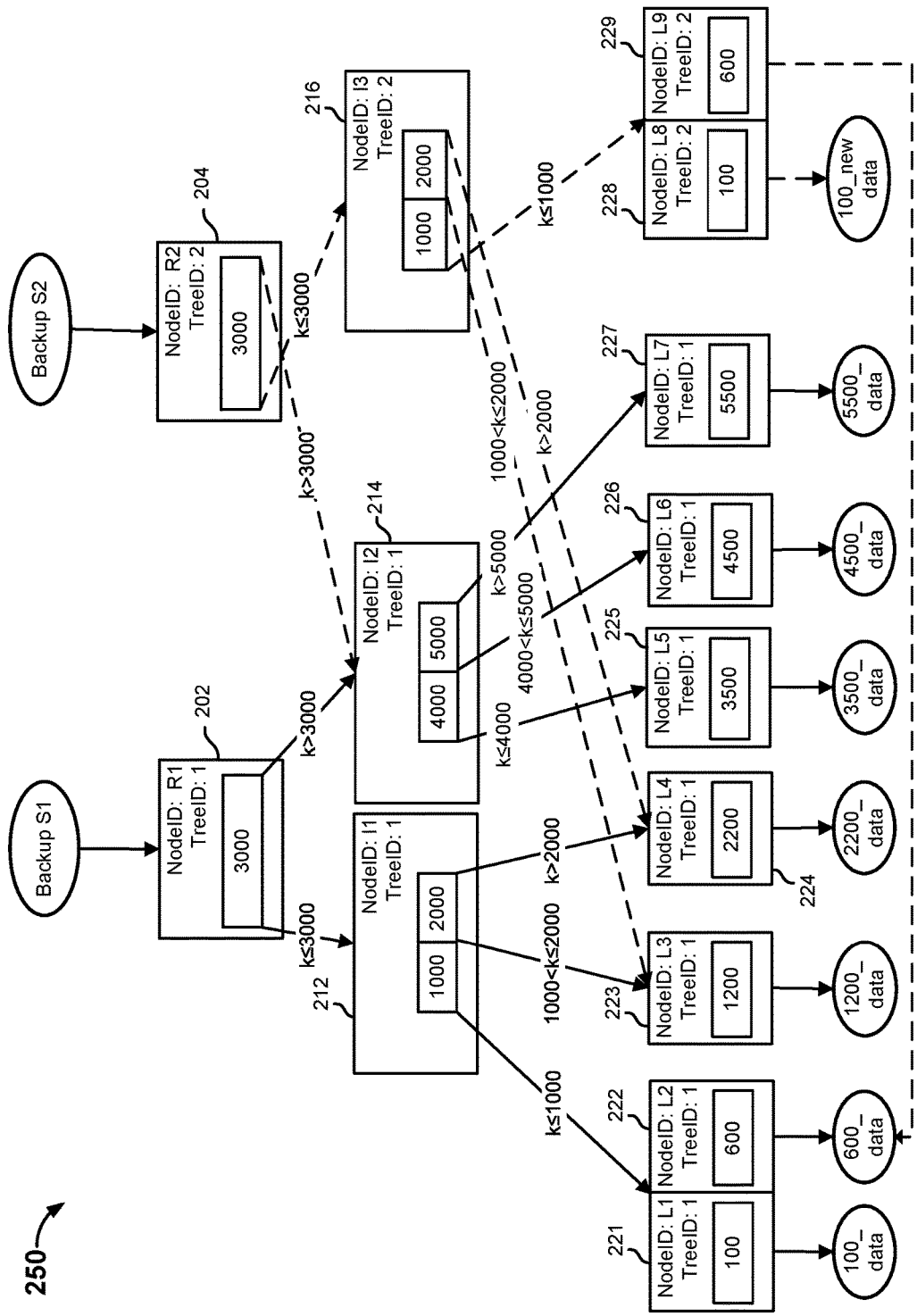
FIG. 2E is a block diagram illustrating an embodiment of a modified snapshot tree of a tree data structure.

FIG. 2E is a block diagram illustrating an embodiment of a modified snapshot tree of a tree data structure. The tree data structure 250 shown in FIG. 2E illustrates a result of the modifications made to tree data structure 240 as described with respect to FIG. 2D.

Figure 3:
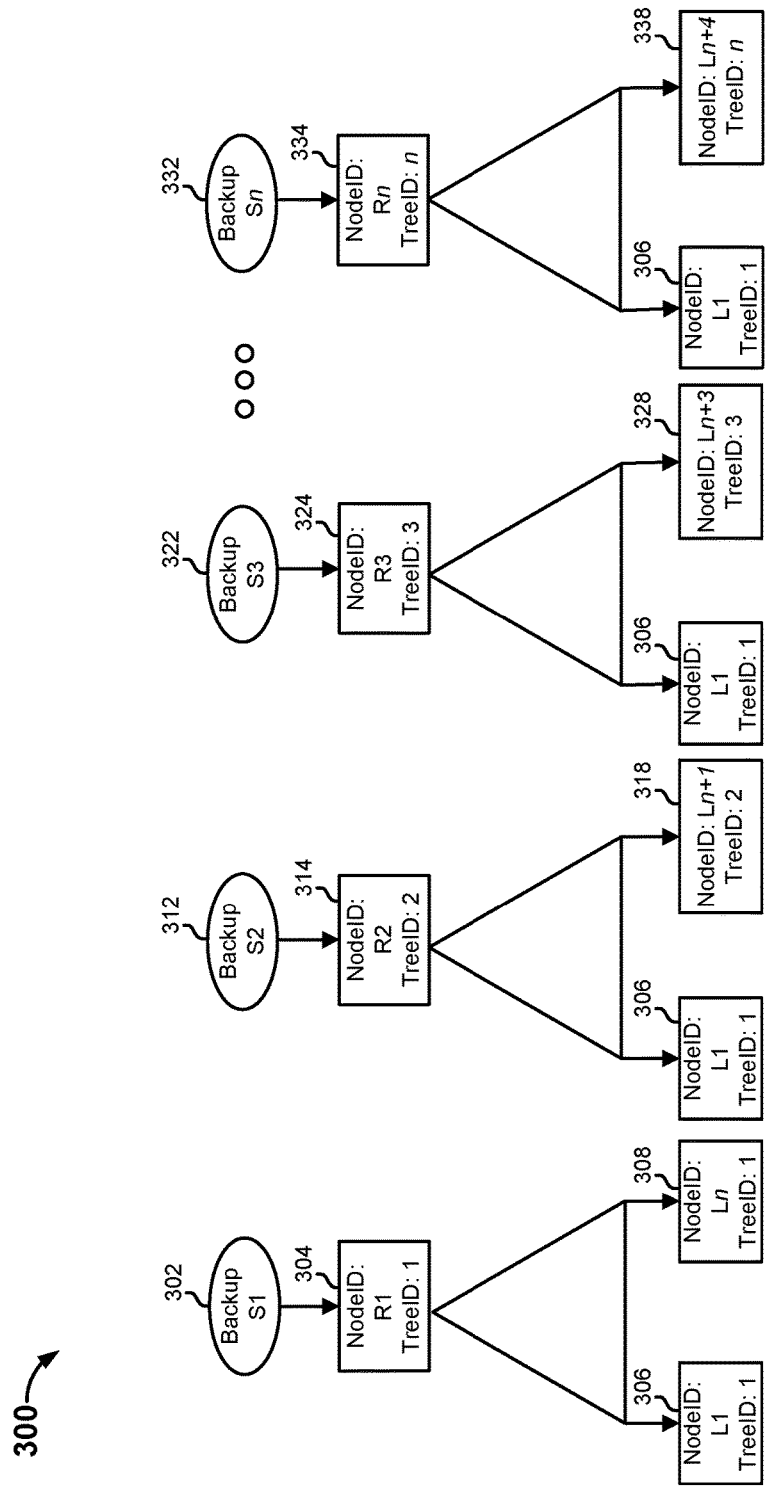
FIG. 3 is a diagram illustrating an embodiment of fully hydrated backup snapshots.

FIG. 3 is a diagram illustrating an embodiment of fully hydrated backup snapshots. In the example shown, the fully hydrated backup snapshots 300 may be generated and stored by a secondary storage system, such as secondary storage system 112.

The fully hydrated backup snapshots 300 are comprised of a first backup snapshot 302, a second backup snapshot 312, a third backup snapshot 322, and a nth fully hydrated backup snapshot 332. Each backup snapshot is associated with a corresponding snapshot tree. Backup snapshot 302 may correspond to a full backup snapshot. Backup snapshots 312, 322, 332 may correspond to incremental backup snapshots.

Backup snapshot 302 is associated with a snapshot tree having a root node 304. The root node of a snapshot tree identifies a backup snapshot with which it is associated. The backup snapshot with which a root node is associated may be determined by the view identifier (e.g., TreeID) associated with the root node. For example, the view identifier of root node 304 is "1," which is associated with "Backup S1."

Backup snapshot 312 is associated with a snapshot tree having a root node 314, backup snapshot 322 is associated with a snapshot tree having a root node 324, and backup snapshot 332 is associated with a snapshot tree having a root node 334. The view identifier of root node 314 is "2," which is associated with "Backup S2," the view identifier of root node 324 is "3," which is associated with "Backup S3," and the view identifier of root node 334 is "n," which is associated with "Backup Sn."

Root node 304 is associated with one or more levels of intermediate nodes (not shown) and a plurality of leaf nodes. Although leaf nodes 306, 308 are shown, the snapshot tree may have a plurality of other leaf nodes. Because root node 304 is associated with a full backup snapshot, traversing the snapshot tree from root node 304 to each of the leaf nodes will reach a leaf node having a view identifier that matches the view identifier associated with root node 304.

Root node 314 is associated with one or more levels of intermediate nodes (not shown) and a plurality of leaf nodes. Although leaf nodes 306, 318 are shown, the snapshot tree may have a plurality of other leaf nodes. Because root node 314 is associated with an incremental backup snapshot, traversing the snapshot tree from root node 314 will arrive at one or more leaf nodes associated with backup snapshot S1 and one or more leaf nodes associated with backup snapshot S2. The one or more nodes that are associated with backup snapshot S2 may be determined by comparing a view identifier of a node with the view identifier of the root node. In the event the view identifier of a node matches the view identifier of root node, then the node is determined to be associated with backup snapshot S2. In the event the view identifier of a node does not match the view identifier of the root node, then the node is determined to be associated with backup snapshot S1. For example, leaf node 306 is associated with backup snapshot S1 because leaf node 306 has a view identifier that matches the view identifier of the root node associated with backup snapshot S1. Leaf node 318 is associated with backup snapshot S2 because leaf node 318 has a view identifier that matches the view identifier of the root node associated with backup snapshot S2.

Root node 324 is associated with one or more levels of intermediate nodes (not shown) and a plurality of leaf nodes. Although leaf nodes 306, 328 are shown, the snapshot tree may have a plurality of other leaf nodes. Because root node 324 is associated with an incremental backup snapshot, traversing the snapshot tree from root node 324 may arrive at one or more leaf nodes associated with backup snapshot S1, one or more leaf nodes associated with backup snapshot S2, and/or one or more leaf nodes associated with backup snapshot S3. The one or more nodes that are associated with backup snapshot S3 may be determined by comparing a view identifier of a node with the view identifier of the root node. In the event the view identifier of a node matches the view identifier of root node, then the node is determined to be associated with backup snapshot S3. In the event the view identifier of a node does not match the view identifier of the root node, then the node is determined to be associated with a previous backup snapshot. For example, leaf node 306 is associated with backup snapshot S1 because leaf node 306 has a view identifier that matches the view identifier of the root node associated with backup snapshot S1. Leaf node 328 is associated with backup snapshot S3 because leaf node 328 has a view identifier that matches the view identifier of the root node associated with backup snapshot S3.

Root node 334 is associated with one or more levels of intermediate nodes (not shown) and a plurality of leaf nodes. Although leaf nodes 306, 338 are shown, the snapshot tree may have a plurality of other leaf nodes. Because root node 334 is associated with an incremental backup snapshot, traversing the snapshot tree from root node 334 may arrive at one or more leaf nodes associated with backup snapshot S1, one or more leaf nodes associated with backup snapshot S2, one or more leaf nodes associated with backup snapshot S3, one or more leaf nodes associated with backup snapshots that were performed between backup snapshot S3 and backup snapshot Sn, and/or one or more leaf nodes associated with backup snapshot Sn. The one or more nodes that are associated with backup snapshot Sn may be determined by comparing a view identifier of a node with the view identifier of the root node. In the event the view identifier of a node matches the view identifier of root node, then the node is determined to be associated with backup snapshot Sn. In the event the view identifier of a node does not match the view identifier of the root node, then the node is determined to be associated with a previous backup snapshot. For example, leaf node 306 is associated with backup snapshot S1 because leaf node 306 has a view identifier that matches the view identifier of the root node associated with backup snapshot S1. Leaf node 338 is associated with backup snapshot Sn because leaf node 338 has a view identifier that matches the view identifier of the root node associated with backup snapshot Sn.

Differences between backup snapshots may be determined by traversing the corresponding snapshot trees and determining the one or more nodes that are not shared between the corresponding snapshot trees. For example, the differences between the backup snapshot S3 and backup snapshot Sn may be determined by traversing the snapshot tree associated with root node 324 and traversing the snapshot tree associated with root node 334. Leaf nodes that are not shared by the two snapshot trees may identified. The leaf nodes that are not shared by the two snapshot trees correspond to bricks of data. A data brick is comprised of one or more data blocks. The one or more data blocks corresponding to the leaf nodes not shared by the two snapshot trees may be identified and provided from a secondary storage system to a primary system.

In some embodiments, one or more nodes that are included in the first snapshot tree, but are not included in a second snapshot tree are identified. For example, one or more nodes that are included in the snapshot tree associated with root node 324, but are not included in the snapshot tree associated with root node 334 are identified. The one or more identified nodes may include one or more leaf nodes. The one or more leaf nodes correspond to bricks of data. A data brick is comprised of one or more data blocks. The one or more data blocks corresponding to the leaf nodes that are included in the first snapshot tree, but are not included in the second snapshot tree may be identified and provided from a secondary storage system to a primary system. For example, the one or more data blocks corresponding to the leaf nodes that are included in the snapshot tree associated with root node 324, but are not included in the snapshot tree associated with root node 334 may be identified and provided from a secondary storage system to a primary system.

Figure 4:
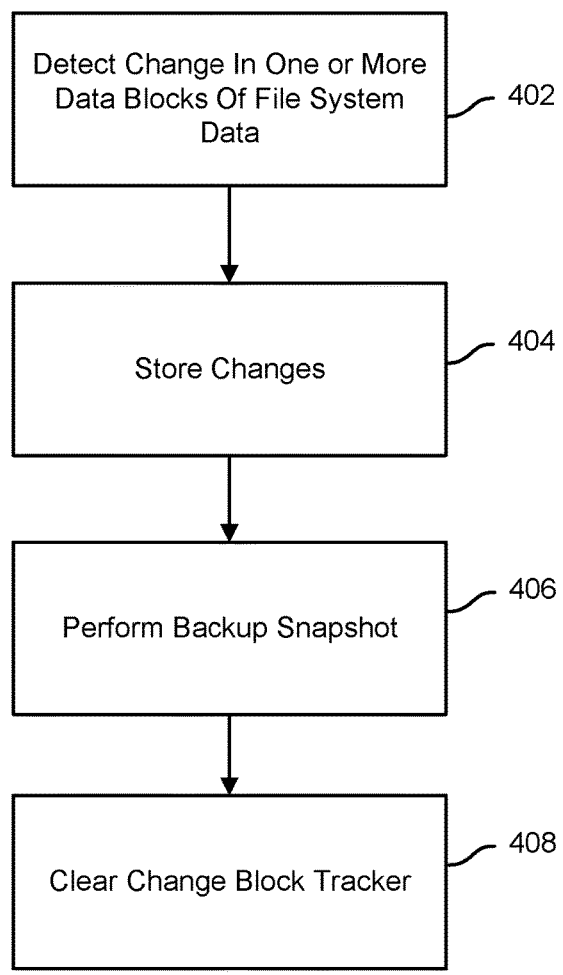
FIG. 4 is a flow chart illustrating an embodiment of process for change block tracking.

FIG. 4 is a flow chart illustrating an embodiment of a process for change block tracking. In the example shown, process 400 may be performed by a change block tracker, such as change block tracker 104.

At 402, a change in one or more data blocks of file system data of the primary system is detected. A change block tracker may receive one or more data blocks associated with one or more files in route to being stored in one or more of the object(s), virtual machine(s), physical entity/entities, file system(s), array backup(s), and/or volume(s) of a primary system. The change block tracker may identify one or more data blocks that have been modified, added, and/or deleted.

At 404, the one or more changes are stored. A change block tracker is configured to maintain a map of the one or more changes to the file system data. The map may include the one or more data blocks that were changed, the values associated with the one or more changed data blocks, and an associated timestamp. The map may include a sequence in which the changes were made.

In some embodiments, the primary system may become corrupted. The primary system may provide the map of the one or more changes to the file system data to a secondary storage system.

At 406, a backup snapshot of the primary system is performed. The backup snapshot may be a full backup snapshot or an incremental backup snapshot. A full backup snapshot may comprise all of the one or more data blocks of file system data of the primary system. An incremental backup may comprise the one or more data blocks of the file system data of the primary system that have changed since a last backup snapshot. The incremental backup may include the data blocks associated with the one or more changes detected by the change block tracker.

At 408, the change block tracker is cleared of the one or more changes that were stored. The change block tracker is cleared of the changes each time a backup is performed. The one or more changes stored by the change block tracker correspond to the one or more changes to the file system data since the last backup.

Figure 5:
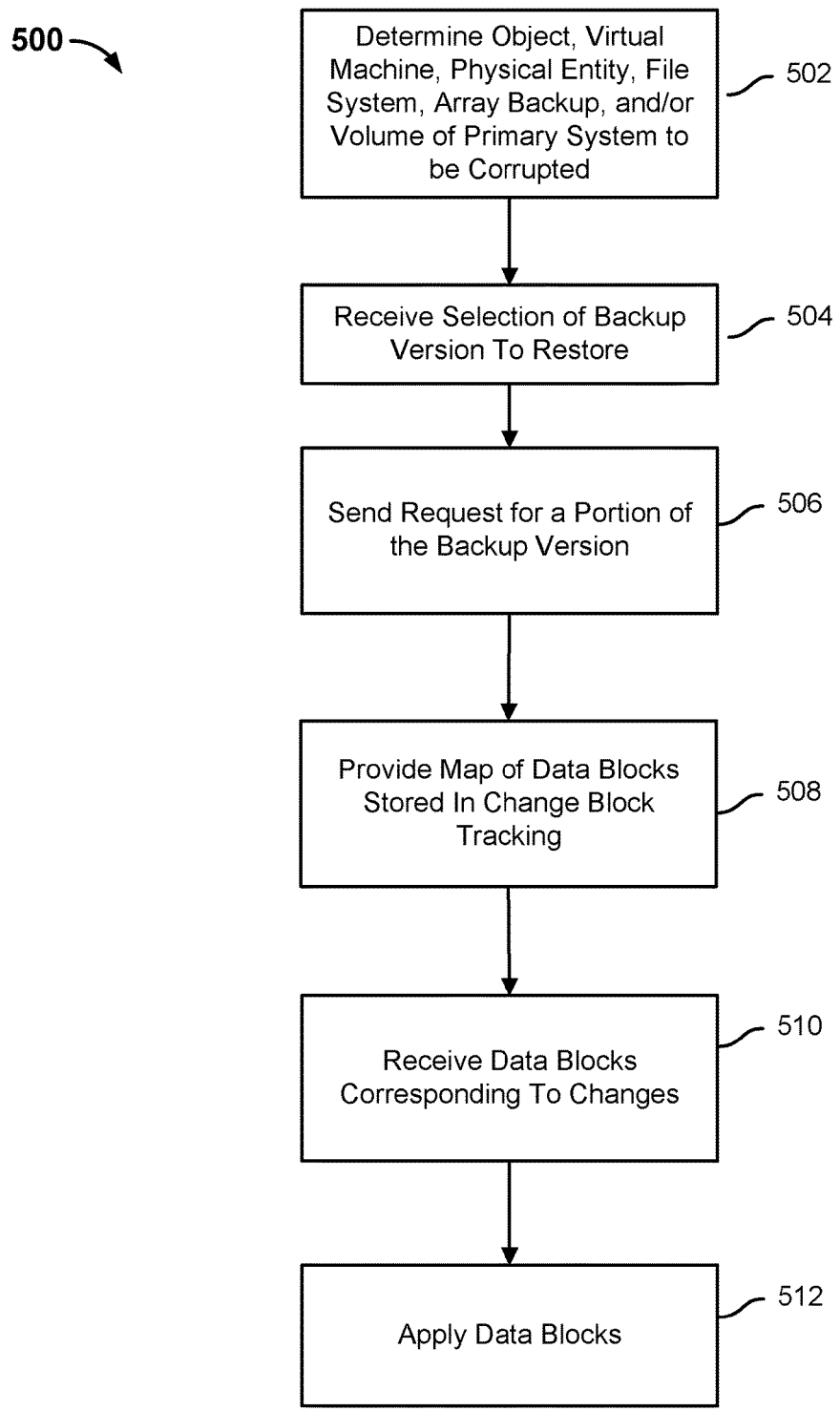
FIG. 5 is a flow chart illustrating an embodiment of a process for restoring data.

FIG. 5 is a flow chart illustrating an embodiment of a process for restoring data. In the example shown, process 500 may be performed by a primary system, such as primary system 102.

At 502, an object, virtual machine, physical entity, file system, array backup, and/or volume of the primary system may be determined to be corrupted. For example, the primary system may attempt to perform one or more file operations (e.g., write operation, read operation) to the object, virtual machine, physical entity, file system, array backup, and/or volume. In some embodiments, in the event the primary system is unable to perform the one or more file operations more than a threshold number of times, the object, virtual machine, physical entity, file system, array backup, and/or volume of the primary system is determined to be corrupted.

At 504, a selection of a backup version to be restored is received. A user of the primary system may select a backup version of the primary system to which the primary system is to be restored. For example, a user may indicate that the object, virtual machine, physical entity, file system, array backup, and/or volume of the primary system is to be restored to a state associated with "backup snapshot S3."

At 506, a request for a portion of the backup version associated with the indicated backup version is sent to the secondary storage system. The secondary storage system stores a fully hydrated backup snapshot. A fully hydrated backup snapshot is a backup that is almost instantaneously accessible (e.g., a few seconds) that does not require rehydration. A fully hydrated snapshot backup may provide a complete view of storage object, virtual machine, physical entity, file system, array backup, and/or volume, regardless if the backup snapshot is a full backup snapshot or an incremental backup snapshot.

At 508, a map of one or more data blocks that have changed since a last backup snapshot is sent to the secondary storage system. A change block tracker is configured to maintain a map of the one or more changes to the file system data. The map may include the one or more data blocks that were changed, the values associated with the one or more changed data blocks, and an associated timestamp. The map may include a sequence in which the changes were made.

At 510, one or more data blocks associated with the selected backup version are received. In the event a request for the entire backup version is sent to the secondary storage system, in response, the secondary storage system is configured to send all of the data blocks associated with the selected backup version. In the event a request for a portion of the backup version is sent to the secondary storage system, in response, the secondary storage system is configured to send one or more data blocks associated with the selected backup version that are not already stored on the object, virtual machine, physical entity, file system, array backup, and/or volume of the primary system.

At 512, the one or more data blocks received from the secondary storage system are applied to the object, virtual machine, physical entity, file system, array backup, and/or volume of the primary system. Subsequently, the object, virtual machine, physical entity, file system, array backup, and/or volume of the primary system is restored to a state of the object, virtual machine, physical entity, file system, array backup, and/or volume corresponding to the selected backup version.

Process 500 reduces the amount of time and resources needed to restore a corrupted object, virtual machine, physical entity, file system, array backup, and/or volume to a particular moment in time and helps to ensure that recovery time objectives are satisfied because the amount of data that needs to be provided to recover the primary system is significantly reduced.

Figure 6:
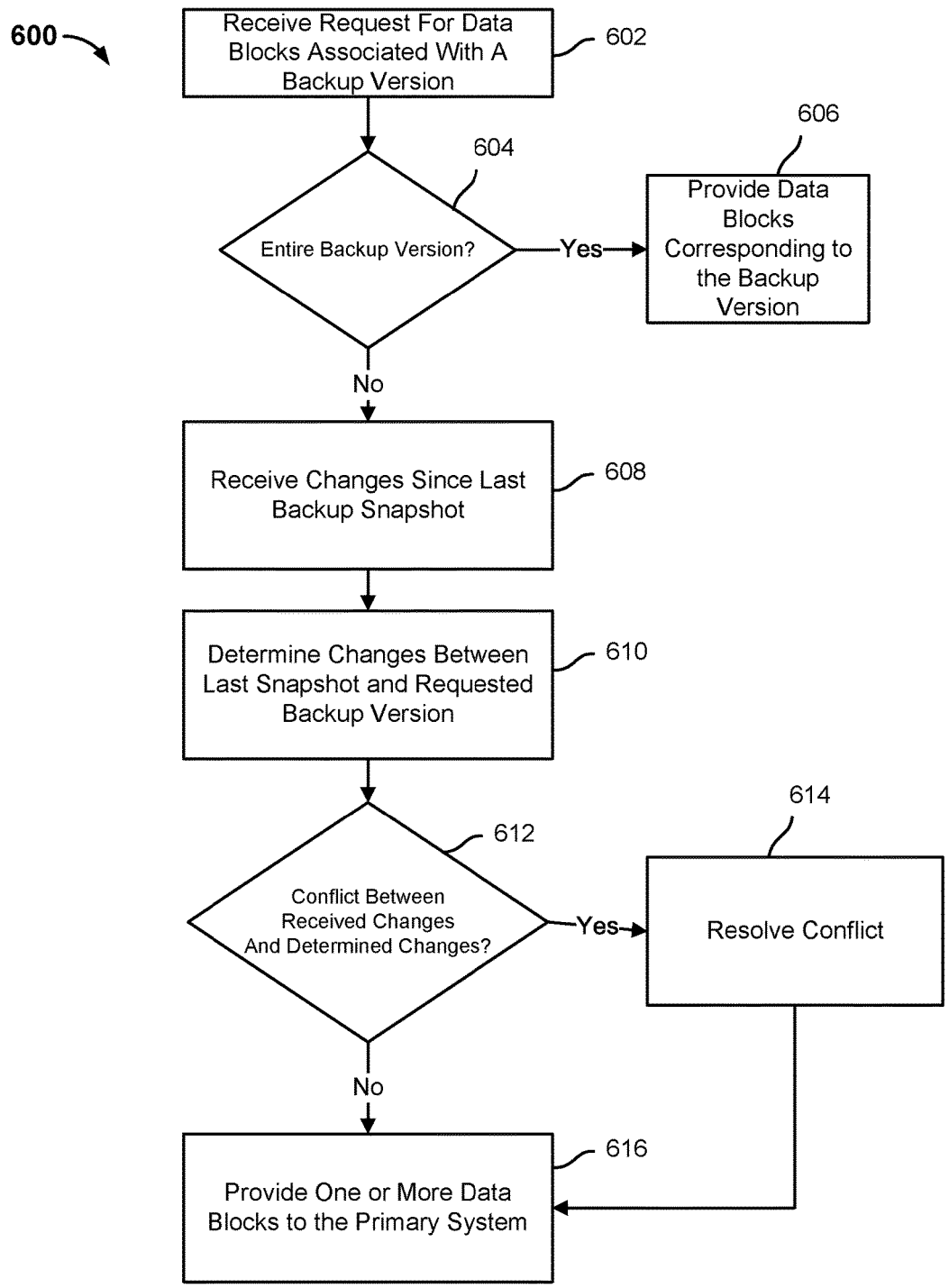
FIG. 6 is a flow chart illustrating an embodiment of a process for providing backup data to restore a corrupted object, virtual machine, physical entity, file system, array backup, and/or volume.

FIG. 6 is a flow chart illustrating an embodiment of a process for providing backup data to restore a corrupted object, virtual machine, physical entity, file system, array backup, and/or volume. Process 600 may be performed by a secondary storage system, such as secondary storage system 112.

At 602, a request for one or more data blocks associated with a backup version is received. The backup version corresponds to a backup snapshot associated with a particular moment in time. The backup version is associated with a snapshot tree. A snapshot tree has a root node that is associated with the backup version.

At 604, it is determined whether the request is for a backup version in its entirety. An object, virtual machine, physical entity, file system, array backup, and/or volume of a primary system may be corrupted. In some embodiments, the object, virtual machine, physical entity, file system, array backup, and/or volume may be partially corrupted. In other embodiments, the object, virtual machine, physical entity, file system, array backup, and/or volume may be completely corrupted or corrupted beyond a threshold amount of corruption. In the event the object, virtual machine, physical entity, file system, array backup, and/or volume has been completely corrupted or corrupted beyond a threshold amount, the primary system may send a request for a backup version in its entirety. In the event the request is for a backup version in its entirety, process 600 proceeds to 606 where all of the data blocks associated with the backup version are provided to the primary system. In the event the request is for a portion of the backup version, process 600 proceeds to 608.

At 608, one or more changes to the primary system that have occurred since a last backup snapshot are received from the primary system. A change block tracker of the primary system is configured to maintain a map of the one or more changes to the file system data. The map may include the one or more data blocks that were changed, the values associated with the one or more changed data blocks, and an associated timestamp. The map may include a sequence in which the changes were made.

At 610, one or more changes between the last backup snapshot and a backup snapshot associated with the requested backup version are determined. The last backup snapshot and the backup snapshot associated with the requested backup version are associated with corresponding snapshot trees. The one or more changes may be determined by traversing the corresponding snapshot trees from their respective root nodes to their corresponding leaf nodes. The snapshot associated with the requested backup version is determined to have changed in the event the snapshot tree associated with the last backup snapshot has one or more nodes that are not accessible from the root node of the snapshot tree associated with the requested backup version. For example, the snapshot tree associated with the last backup snapshot may be traversed from the root node associated with the last backup snapshot to each of the nodes of the snapshot tree. In the event the snapshot tree associated with the last backup snapshot tree is traversed to one or more nodes not included in the snapshot tree associated with the requested backup version, the snapshot tree associated with the requested backup version is determined to have changed. The one or more changes may correspond to leaf nodes that are not included in both snapshot trees. The leaf nodes correspond to a data brick stored on the secondary storage system. The one or more data blocks corresponding to the leaf nodes are determined.

At 612, it is determined whether a conflict exists between the determined changes between the last snapshot and the requested backup version, and the received changes since the last backup snapshot. In some embodiments, one or more data blocks of file system data may have changed on the primary system, but the primary system has yet to perform a backup snapshot that stores the changes to the secondary storage system. A conflict may exist because a data brick comprising one or more data blocks may have changed between the requested backup version and the last snapshot and that one or more data blocks corresponding to the changed data brick may have changed since the last backup snapshot. In the event a conflict exists, process 600 proceeds to 614. In the event a conflict does not exist, process 600 proceeds to 616.

At 614, the conflict is resolved by including in the one or more data blocks that are provided to the primary system the one or more data blocks corresponding to the one or more data bricks of the requested backup version that were changed and not including in the one or more data blocks the one or more data bricks of the last backup snapshot that correspond to the one or more data blocks that have changed since the last backup snapshot. For example, suppose a data brick associated with the requested backup version stores the value "X." Further suppose that sometime between the requested backup version and the last backup snapshot, the data brick has been modified to store the value "Y." After the last backup snapshot, suppose a data block on the primary system corresponding to the data brick is changed from "Y" to "Z." Subsequently, the object, virtual machine, physical entity, file system, array backup, and/or volume of the primary system becomes corrupted, but the data block still stores a value of "Z." When the primary system is restored to the selected backup version, the data block will still store a value of "Z" unless a data block with a value of "Y" is provided to the primary system. The one or more data blocks that have changed since a last backup snapshot and the one or more data blocks that have changed between the last backup snapshot and the backup snapshot version are provided to primary system. Providing both a data block storing "X" (i.e., the value of the data block associated with the requested backup version) and a data block storing "Y" (i.e., the value of the data block associated with the last backup snapshot) is a waste of time and resources because only the data block storing "X" is needed to restore the primary system to the requested backup version. The conflict is resolved by providing the data block storing "X" (the data block associated with the requested backup version) and not providing the data block storing "Y" (the data block associated with the last backup snapshot).

At 616, one or more data blocks are provided to the primary system. In some embodiments, one or more data blocks corresponding to the determined changes since the last backup snapshot and the requested backup version and one or more data blocks corresponding to the received changes since the last backup snapshot are provided. In some embodiments, the one or more data blocks corresponding to the leaf nodes that are included in the snapshot tree associated with the requested backup version, but are not included in the last backup snapshot, are provided from the secondary storage system to the primary system. In some embodiments, the one or more data blocks that were changed since the last backup, but not between the requested backup version and the last backup snapshot are provided from the secondary storage system to the primary system.

Figure 7:
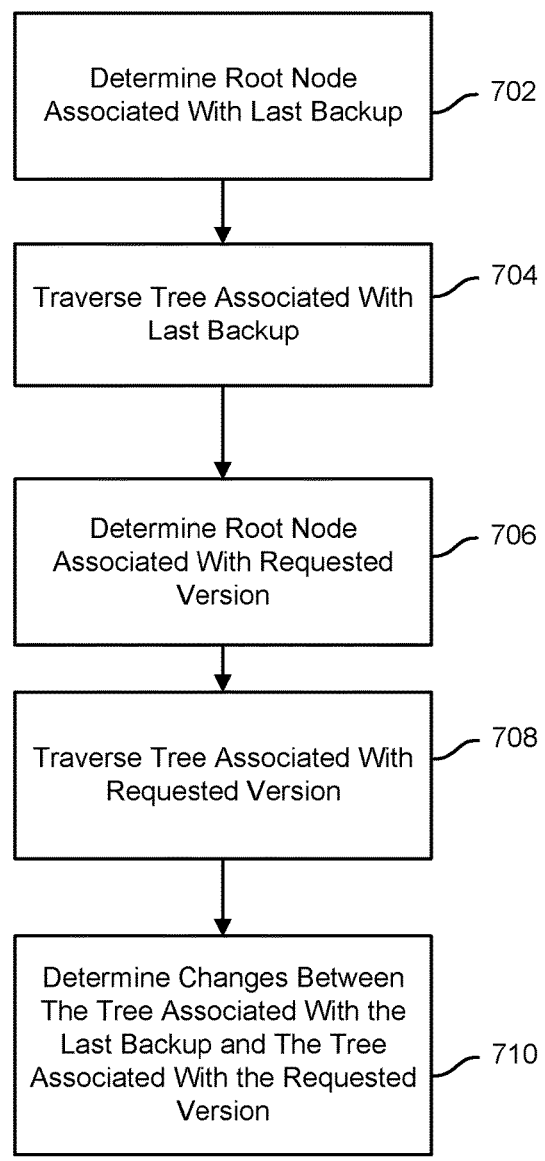
FIG. 7 is a flow chart illustrating an embodiment of a process for determining changes between a last backup snapshot and a backup version to be restored.

FIG. 7 is a flow chart illustrating an embodiment of a process for determining changes between a last backup snapshot and a backup version to be restored. In the example shown, process 700 may be performed by a file system manager, such as file system manager 115. Process 700 may be implemented to perform some or all of 610 of process 600.

At 702, a root node associated with the last backup snapshot is determined. The last backup snapshot is associated with a snapshot tree. The associated snapshot tree has a root node that corresponds to the last backup snapshot.

At 704, the snapshot tree associated with the last backup snapshot is traversed from the root node associated with the last backup to each node of the snapshot tree associated with the last backup snapshot.

At 706, a root node associated with a backup version to be restored is determined. The backup version to be restored is associated with a snapshot tree. The associated snapshot tree has a root node that corresponds to the backup version to be restored.

At 708, the snapshot tree associated with the backup version to be restored is traversed from the root node associated with the backup version to be restored to each node of the snapshot tree associated the backup version.

At 710, one or more changes between the snapshot tree associated with the last backup and the snapshot tree associated with the backup version to be restored are determined. The snapshot associated with the requested backup version is determined to have changed in the event the snapshot tree associated with the last backup snapshot has one or more nodes that are not accessible from the root node of the snapshot tree associated with the requested backup version. For example, the snapshot tree associated with the last backup snapshot may be traversed from the root node associated with the last backup snapshot to each of the nodes of the snapshot tree. In the event the snapshot tree associated with the last backup snapshot tree is traversed to one or more nodes not included in the snapshot tree associated with the requested backup version, the snapshot tree associated with the requested backup version is determined to have changed. The one or more changes may correspond to leaf nodes that are not included in both snapshot trees. The leaf nodes correspond to a data brick stored on the secondary storage system. The one or more data blocks corresponding to the leaf nodes are determined.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   receive, at a secondary storage system, an indication of one or more changes to file system data since a last backup snapshot;
   determine one or more changes to the file system data between a requested backup version and the last backup snapshot, wherein to determine the one or more changes to the file system data between the requested backup version and the last backup snapshot, the processor is further configured to:
   traverse a snapshot tree corresponding to the requested backup version, wherein the snapshot tree corresponding to the requested backup version provides a first complete view of file system data of a primary system at a time when the requested backup version was performed;
   traverse a snapshot tree corresponding to the last backup snapshot version, wherein the snapshot tree corresponding to the last backup snapshot version provides a second complete view of the file system data of the primary system at a time when the last backup snapshot version was performed; and
   determine one or more leaf nodes not shared by the snapshot tree corresponding to the requested backup version and the snapshot tree corresponding to the last backup snapshot version, wherein the determined one or more leaf nodes are associated with one or more data blocks corresponding to the one or more changes to file system data between the requested backup version and the last backup snapshot; and
   provide to the primary system, one or more data blocks corresponding to the one or more changes to the file system data since the last backup snapshot and the one or more data blocks corresponding to the one or more changes to file system data between the requested backup version and the last backup snapshot; and
   a memory coupled to the processor and configured to provide the processor with instructions.

2. The system of claim 1, wherein in response to receiving the one or more data blocks corresponding to the one or more changes to the file system data since the last backup snapshot and the one or more data blocks corresponding to the one or more changes to file system data between the requested backup version and the last backup snapshot, the primary system is configured to apply the received data blocks to an object, virtual machine, physical entity, file system, array backup, and/or volume of the primary system.

3. The system of claim 1, wherein the processor is further configured to receive a request for one or more data blocks associated with the requested backup version.

4. The system of claim 3, wherein an object, virtual machine, physical entity, file system, array backup, and/or volume of the primary system is corrupted.

5. The system of claim 3, wherein the request is for an entire version of the requested backup version.

6. The system of claim 5, wherein in the event the request is for the entire version of the requested backup version, one or more data blocks associated with the entire version of the requested backup version are provided to the primary system in place of the one or more data blocks corresponding to the one or more changes to the file system data since the last backup snapshot and the one or more data blocks corresponding to the one or more changes to file system data between the requested backup version and the last backup snapshot.

7. The system of claim 1, wherein the last backup snapshot is associated with the snapshot tree corresponding to the last backup snapshot and the requested backup version is associated with the snapshot tree corresponding to the requested backup version.

8. The system of claim 7, wherein at least one node of the snapshot tree corresponding to the last backup snapshot references at least one node of the snapshot tree corresponding to the requested backup version.

9. The system of claim 7, wherein the snapshot tree corresponding to the last backup snapshot and the snapshot tree corresponding to the requested backup version have corresponding root nodes.

10. The system of claim 1, wherein the one or more determined changes to the file system data between the requested backup version and the last backup snapshot includes one or more nodes included in the snapshot tree corresponding to the requested backup version and not included in the snapshot tree corresponding to the last backup snapshot.

11. The system of claim 10, wherein the one or more data blocks corresponding to the one or more changes to file system data between the requested backup version and the last backup snapshot include one or more data blocks corresponding to the one or more nodes included in the snapshot tree corresponding to the requested backup version and not included in the snapshot tree corresponding to the last backup snapshot.

12. The system of claim 1, wherein the processor is further configured to determine whether a conflict exists between the one or more data blocks corresponding to the one or more changes to the file system data since the last backup snapshot and the one or more data blocks corresponding to the one or more changes to file system data between the requested backup version and the last backup snapshot.

13. The system of claim 12, wherein the processor is further configured to resolve the conflict at least in part by providing at least one data block corresponding to the one or more changes to file system data between the requested backup version and the last backup snapshot in place of at least one data block corresponding to the one or more changes to the file system data since the last backup snapshot.

14. The system of claim 1, wherein the snapshot tree corresponding to the request backup version includes a first root node, a first set of intermediate nodes, and a first set of leaf nodes, wherein the snapshot tree corresponding to the last backup snapshot version includes a second root node, a second set of intermediate nodes, and a second set of leaf nodes, wherein at least one intermediate node is included in the first set of intermediate nodes and the second set of intermediate nodes, and wherein at least one leaf node is included in the first set of leaf nodes and the second set of leaf nodes.

15. The system of claim 1, wherein the snapshot tree corresponding to the request backup version includes a first root node, a first set of intermediate nodes, and a first set of leaf nodes, wherein to traverse the snapshot tree corresponding to the requested backup version, the processor is further configured to traverse the snapshot tree corresponding to the requested backup version from the first root node to an intermediate node of the first set of intermediate nodes, and from the intermediate node of the first set of intermediate nodes to a leaf node of the first set of leaf nodes.

16. The system of claim 1, wherein the first complete view of the file system data of the primary system includes a first root node, a first set of intermediate nodes, and a first set of leaf nodes, wherein the file system data of the primary system is stored in the first set of leaf nodes, wherein any of the file system data of the primary system data is accessed from the first set of leaf nodes.

17. A method, comprising:
receiving, at a secondary storage system, an indication of one or more changes to file system data since a last backup snapshot;
determining one or more changes to the file system data between a requested backup version and the last backup snapshot, wherein determining the one or more changes to the file system data between the requested backup version and the last backup snapshot comprises:
traversing a snapshot tree corresponding to the requested backup version, wherein the snapshot tree corresponding to the requested backup version provides a first complete view of file system data of a primary system at a time when the requested backup version was performed;
traversing a snapshot tree corresponding to the last backup snapshot version, wherein the snapshot tree corresponding to the last backup snapshot version provides a second complete view of the file system data of the primary system at a time when the last backup snapshot version was performed; and
determining one or more leaf nodes not shared by the snapshot tree corresponding to the requested backup version and the snapshot tree corresponding to the last backup snapshot version, wherein the determined one or more leaf nodes are associated with one or more data blocks corresponding to the one or more changes to file system data between the requested backup version and the last backup snapshot; and
providing to the primary system, one or more data blocks corresponding to the one or more changes to the file system data since the last backup snapshot and the one or more data blocks corresponding to the one or more changes to file system data between the requested backup version and the last backup snapshot.

18. The method of claim 17, further comprising receiving a request for one or more data blocks associated with the requested backup version.

19. The method of claim 17, wherein an object, virtual machine, physical entity, file system, array backup, and/or volume of the primary system is corrupted.

20. The method of claim 17, wherein in response to receiving the one or more data blocks corresponding to the one or more changes to the file system data since the last backup snapshot and the one or more data blocks corresponding to the one or more changes to file system data between the requested backup version and the last backup snapshot, the primary system is configured to apply the received data blocks to an object, virtual machine, physical entity, file system, array backup, and/or volume of the primary system.

21. The method of claim 17, wherein the last backup snapshot is associated with the snapshot tree corresponding to the requested backup version and the requested backup version is associated with the snapshot tree corresponding to the last backup snapshot version.

22. A computer program product, the computer program product being embodied in a non-transitory computer readable storage medium and comprising computer instructions for:
receiving an indication of one or more changes to file system data since a last backup snapshot;
determining one or more changes to the file system data between a requested backup version and the last backup snapshot, wherein determining the one or more changes to the file system data between the requested backup version and the last backup snapshot comprises:
traversing a snapshot tree corresponding to the requested backup version, wherein the snapshot tree corresponding to the requested backup version provides a first complete view of file system data of a primary system at a time when the requested backup version was performed;

traversing a snapshot tree corresponding to the last backup snapshot version, wherein the snapshot tree corresponding to the last backup snapshot version provides a second complete view of the file system data of the primary system at a time when the last backup snapshot version was performed; and determining one or more leaf nodes not shared by the snapshot tree corresponding to the requested backup version and the snapshot tree corresponding to the last backup snapshot version, wherein the determined one or more leaf nodes are associated with one or more data blocks corresponding to the one or more changes to file system data between the requested backup version and the last backup snapshot; and providing to the primary system, one or more data blocks corresponding to the one or more changes to the file system data since the last backup snapshot and the one or more data blocks corresponding to the one or more changes to file system data between the requested backup version and the last backup snapshot.

* * * * *

UNITED STATES PATENT AND TRADEMARK OFFICE
CERTIFICATE OF CORRECTION

PATENT NO. : 10,261,865 B1
APPLICATION NO. : 15/964678
DATED : April 16, 2019
INVENTOR(S) : Rupesh Bajaj Page 1 of 1

It is certified that error appears in the above-identified patent and that said Letters Patent is hereby corrected as shown below:

In the Specification

In Column 8, Line 37, delete ""100 data"" and insert --"100_data"--, therefor.
In Column 10, Lines 35-36, delete ""100 data."" and insert --"100_data."--, therefor.
In Column 10, Lines 42-43, delete ""600 data."" and insert --"600_data."--, therefor.
In Column 10, Lines 49-50, delete ""1200 data."" and insert --"1200_data."--, therefor.
In Column 10, Lines 56-57, delete ""2200 data."" and insert --"2200_data."--, therefor.
In Column 10, Lines 63-64, delete ""3500 data."" and insert --"3500_data."--, therefor.
In Column 11, Lines 3-4, delete ""4500 data."" and insert --"4500_data."--, therefor.
In Column 11, Lines 10-11, delete ""5500 data."" and insert --"5500_data."--, therefor.
In Column 12, Line 20, delete ""100 data"" and insert --"100_data"--, therefor.
In Column 12, Line 21, delete ""100 new data"" and insert --"100_new data"--, therefor.
In Column 12, Line 32, delete ""100 data"" and insert --"100_data"--, therefor.
In Column 12, Line 32, delete ""100 new data,"" and insert --"100_new data,"--, therefor.
In Column 12, Line 67, delete ""100 new data."" and insert --"100_new data."--, therefor.
In Column 13, Line 9, delete "k<1000" and insert --k≤1000--, therefor.

Signed and Sealed this
Third Day of December, 2019

Andrei Iancu
*Director of the United States Patent and Trademark Office*